2,959,518
FUNGICIDES

Jan Hendrik Uhlenbroek and Martinus Johannes Koopmans, Weesp, Netherlands, assignors to North American Philips Company, Inc., New York, N.Y., a corporation of Delaware No Drawing. Filed June 10, 1957, Ser. No. 664,456

Claims priority, application Netherlands June 11, 1956

11 Claims. (Cl. 167—30)

Our invention relates to new and novel compounds, to fungicidal compositions containing these compounds, to methods of destroying fungi with these compounds and to methods of preparing these compounds.

A principal object of our invention is to provide new and novel compounds which are particularly adapted to destroy fungi on plants.

A second principal object of our invention is to provide fungicidally active compositions containing the compounds of our invention.

Another object of our invention is to provide a means for destroying fungi harmful to plants without harming the plants.

Still another object of our invention is to provide a method of producing compounds that are particularly adapted to destroy fungi on plants.

These and other objects of our invention will be apparent from the description that follows.

According to our invention we have prepared a new and novel series of trichloromethyl-thiolsulphonate and trichlormethyl sulphonyl disulphide compounds and have quite unexpectedly discovered that these compounds have excellent utility as fungicides for plant fungi because while these compounds are all excellent destroyers of plant fungi they are all safe to use on plants as they have little or no effect on the plant itself.

More particularly, we have found that the following groups of new and novel compounds are very effective fungicides while being non-phytotoxic:

I. Compounds corresponding to the general formula $$Q-R_1-\underset{O}{\overset{\|}{C}}-\underset{H}{\overset{|}{N}}-\langle\text{benzene}\rangle-SO_2SCCl_3$$

wherein $R_1$ is a member selected from the group consisting of saturated and olefinically unsaturated aliphatic hydrocarbon radicals containing from 1 to 6 carbon atoms and Q is a member of the groups consisting of halogen atoms, and trimethylamine chloride, carboxyl, ester, and phenoxy radicals, salts thereof and esters thereof.

In this series of compounds $R_1$ may be $-CH_2-$, $-CH_2-CH_2-$, $-CH_2-CH_2-CH_2-$, $-CH=CH-CH_2-$ $$-CH_2-CH_2-\underset{CH_3}{\overset{|}{CH}}-CH_2-$$

$$-CH_2-CH_2-CH_2-CH_2-\underset{CH_3}{\overset{H}{\underset{|}{C}}}- \quad \text{and} \quad -\underset{CH_3}{\overset{CH_3}{\underset{|}{C}}}-$$

Q may be a halogen such as Cl—, F—, I— or Br—, an ester group such as $C_2H_5COOC-$, $CH_3COOC-$, the carboxylic group, a phenoxy group $$\left(\langle\text{benzene}\rangle-O-\right)$$

and a trimethylamine chloride group $-(CH_3)_3NCCl-$.

II. Trichloromethyl - p-succinimido - benzene thiolsulphonate, salts thereof and esters thereof.

III. A compound corresponding to the general formula $$R_2O(R_3O)_m-\langle\text{benzene}\rangle-SO_2SCCl_3$$

wherein $R_2$ and $R_3$ are selected from the group consisting of saturated aliphatic hydrocarbon residues and aliphatic hydrocarbon residues which together with the benzene ring form a bicyclic system and m is a whole number from 1 to 6, salts thereof and esters thereof.

In this series $R_2O(R_3O)_m$ may be $C_2H_5OC_2H_4O-$, $C_4H_9OC_2H_4O-$, $O-C_2H_5-OC_2H_4O-C_2H_4O-$ and $$\begin{array}{c}O-\\ H_2C\diagup\\ \diagdown C-O-\\ H_2\end{array}$$

both free bonds being joined to the same benzene ring.

IV. A compound corresponding to the general formula:

$$\underset{HOOC-R_4}{}\langle\text{benzene}\rangle-SO_2SCCl_3$$

wherein $R_4$ is a member selected from the group consisting of saturated and olefinically unsaturated aliphatic hydrocarbon residues, salts thereof and esters thereof.

In this series $HOOC-R_4$ may be $HOOC-CH=CH-$, $HOOC-CH_2-CH_2-$, $C_2H_5OOC-CH_2-$ or $HOOC-CH_2-$ V. A compound corresponding to the general formula:

$$\underset{R_6}{\overset{R_5}{}}N-\underset{O}{\overset{\|}{C}}-\langle\text{benzene}\rangle-SO_2SCCl_3$$

wherein $R_5$ and $R_6$ are members of the group consisting of hydrogen and saturated aliphatic hydrocarbon radicals, salts thereof and esters thereof.

In this series $R_5$ and $R_6$ may independently be H, $CH_3-$ or $C_2H_5-$.

VI. A compound corresponding to the general formula $$R_7ArOR_8SO_2SCCl_3$$

wherein Ar is a member selected from the group consisting of nepthyl and phenyl radicals, $R_8$ is a member selected from the group consisting of saturated aliphatic hydrocarbon residues, olefinically unsaturated aliphatic hydrocarbon residues and alkylene-oxy-alkylene residues and $R_7$ is at least one member of the group consisting of hydrogen atoms, halogen atoms, nitro radicals, carboxyl radicals, alkyl radicals and alkoxy radicals, salts thereof and esters thereof.

In this series $R_7ArOR_8$ may be $\langle\text{benzene}\rangle-O-CH_2-CH_2-$, $Cl-\langle\text{benzene(Cl)}\rangle-O-CH_2-CH_2-$, $\underset{NO_2}{\langle\text{benzene}\rangle}-OCH_2CH_2-$, $\langle\text{benzene}\rangle-OCH_2-CH_2-$, $O_2N-\langle\text{benzene}\rangle-OCH_2-CH_2-$, $\langle\text{benzene}\rangle-O-CH_2-CH_2-CH_2-$, $H_3C-\langle\text{benzene}\rangle-OCH_2CH_2-$ and

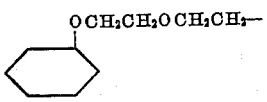

In this series $R_5$ and $R_6$ may independently be H, $CH_3$ or $C_2H_5$.

VII. Compounds corresponding to the general formula:

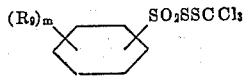

wherein $R_9$ is a member selected from the group consisting of hydrogen atoms, halogen atoms and alkyl, nitro, hydroxy, alkoxy, amino, acylamino, ester and carboxyl radicals and $m$ is a whole number from 1 to 5, salts thereof and esters thereof.

In this series

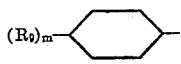

may be

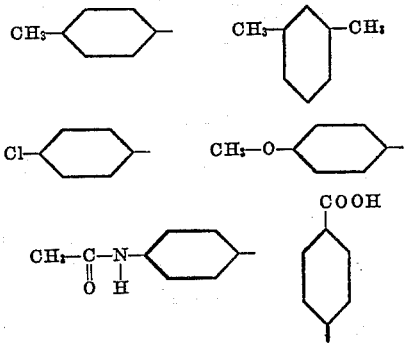

and

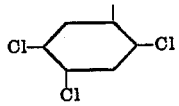

VIII. Compounds corresponding to the general formula:

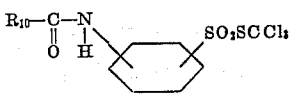

wherein $R_{10}$ is a member of the group consisting of amino, alkyl amino, and dialkylamino radicals, salts thereof and esters thereof.

In this series $R_{10}$ may be $H_2N-$, $(CH_3)_2N-$, and

IX. Compounds corresponding to the general formula:

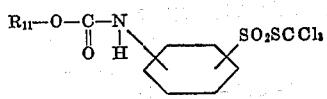

wherein $R_{11}$ is a member of the group consisting of saturated and olefinically unsaturated aliphatic hydrocarbon radicals, salts thereof and esters thereof.

In this series $R_{11}$ may be $CH_3-$, $CH_3CH_2-$, $CH_3-CH-CH_3-$, and $CH_2=CH-$ X. Compounds corresponding to the general formula:

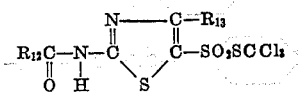

wherein $R_{12}$ and $R_{13}$ are members selected from the group consisting of hydrogen atoms and saturated and olefinically unsaturated aliphatic hydrocarbon radicals, salts thereof and esters thereof.

In this series $R_{12}$ and $R_{13}$ may each be H, $CH_3-$, $C_2H_5CH_2=CH-$, $CH_3-CH_2-CH_2-CH_2-$ and $CH_3-CH_2-CH_2-CH_2-CH_2-$ XI. Compounds corresponding to the general formula:

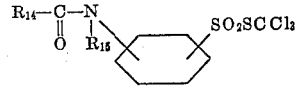

wherein $R_{14}$ is a member of the group consisting of hydrogen atoms and saturated and olefinically unsaturated aliphatic hydrocarbon radicals and $R_{15}$ is a member selected from the group consisting of saturated and olefinically unsaturated aliphatic hydrocarbon radicals, salts thereof and esters thereof.

In this series $R_{14}$ and $R_{15}$ may be $CH_3-$, $CH_3CH_2-$, $CH_3CH_2CH_2CH_2-$ and $CH_2=CH-$.

XII. Compounds corresponding to the general formula:

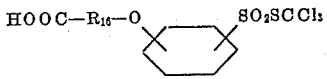

wherein $R_{16}$ is a radical selected from the group consisting of saturated and olefinically unsaturated aliphatic hydrocarbon radicals, salts thereof and esters thereof.

In this series $R_{16}$ may be $-CH_2-$, $-CH_2CH_2-$ and $-CH=CH-$.

XIII. Compounds corresponding to the general formula:

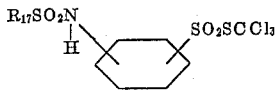

wherein $R_{17}$ is an alkyl radical containing from 1 to 6 carbon atoms, salts thereof and esters thereof.

In this series $R_{17}$ may be $CH_3-$, $CH_3CH_2-$, $CH_3CH_2CH_2-$ $CH_3CH_2C=CH-$
       $|$
       $CH_3$ and $CH_3-CH=CH-$.

The compounds of our invention are prepared by reacting perchloromethyl-mercaptan, preferably in the presence of a solvent, the appropriate derivative of

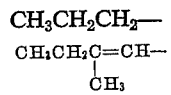

or (in the case of the compounds of series VII) the appropriate derivative of

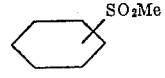

or (in the case of the compounds of series X) the appropriate derivative of

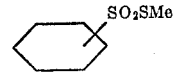

In call cases Me may be a metal atom, an ammonium group or a hydrogen atom but is preferably an alkali metal atom such as sodium or potassium.

The solvent may be an organic solvent of low polarity such as the aromatic, cycloaliphatic or aliphatic hydrocarbons particularly benzene, toluene, xylene, hexane, heptane, cyclohexane, gasoline, and ligroin; aliphatic and aromatic ethers such as dimethyl ether, diethyl ether, methyl-ethyl-ether, anisol, phenetol and dioxane; chlorinated aromatic and aliphatic compounds such as tetrachloromethane, chloroform, methylene chloride, 1,2-dichlorethane and chlorbenzene. Aliphatic alcohols and ketones such as methanol, ethanol, propanol, acetone and methyl-ethyl ketone may also be used, however, the other solvents are preferred.

Water itself or mixture of water with one of the above-mentioned organic solvents are excellent solvents for carrying out the process. In the latter case it is important to choose the solvent in which the perchloromethyl-mercaptan is readily soluble but in which the desired reaction product does not dissolve.

When the water or a mixture of water and one of the organic solvents is used it is advisable that the reaction take place under neutral conditions because in an acid medium a large proportion of side products are formed while under alkaline conditions a decomposition of the perchloromethyl mercaptan or the desired product may occur. In order to maintain the neutral reaction conditions it is advisable to add a suitable quantity of an acid binding agent such as sodium carbonate or sodium bicarbonate to the reaction medium.

In an aqueous medium a reaction temperature of between about 10° C. and 40° C. is used. In a non-aqueous medium it is advisable to use a higher reaction temperature. However, temperatures above 100° C. do not yield optimum results.

The sulphinic acids or the corresponding salts of these compounds, which are employed for the reaction with perchloromethyl-mercaptan, may be produced by the reduction of the corresponding sulphochlorides, for example, with sodium sulphite or tin chloride. It has been found that the crude reaction mixture, obtained by using sulphite as a reducing agent, is capable of reacting with perchloromethyl-mercaptan, i.e. without an intermediate purification and even in the presence of a surplus of sodium sulphite, to produce the compounds of the invention.

The compounds of our invention are effective fungicides either in the free state or in the form of esters or salts such as the methyl, butyl or propyl or benzyl esters or the sodium, calcium or copper salts.

The compounds of our invention are effectively used to destroy plant fungi by applying to the plants compositions containing these compounds and suitable carriers therefor. Thus the compounds of our invention may be applied to plants in the form of:

(a) Mixable oils with 15 to 20% of active constituent, 15% nonionic emulsifier such ethylene glycol monolaurate and polyoxyethylene sorbitan monopalmitate, and the remainder solvents such as kerosene, or benzene. However, ketones, for example cyclohexanone are preferred;

(b) Aerosols with solvents such as acetone, methyl-ethyl-ketone, and cyclohexanone and "as a propellant" methyl-chloride or Freon;

(c) Spray powders with 25 to 80% of active substances and the remainder dispersing agents such as fatty alcohol sulphates examples of which are lauryl sulphate, and myricyl sulphate or a sodium alkyl aryl sulfonate and/or solid carriers, such as kaolin, chalk and alum earth and attapulgite as well as mixtures of these with materials that prevent the formation of clods, such as colloidal silicic acid;

(d) Dust powders with 1 to 20%, for example 5%, of active substance in a mixture of infusorial earth and dolomite marl;

(e) Seed-protecting preparations, for example, 50% of active substance combined with kaolin with the addition of adhesives, such as watchmaker's oil;

(f) So-called "coated dust," in which the active substance is applied to an absorbent carrier, for example, infusorial earth.

Our invention will now be more fully described with reference to the following examples which illustrate the preparation of the compounds of our invention and tables which illustrate their use as fungicides.

In the tables data concerning the fungitoxicity and the phytotoxicity of the compounds claimed are tabulated. These results were determined in the following manner:

The fungitoxical effect of the compounds according to the present invention was determined as follows. From each substance a plurality of solutions was made in acetone. These solutions formed, with respect to their content of the substance to be tested, a geometrical progression with a ratio of 1.26 (i.e. log 0.1). From each solution four drops of a size of 10 $\mu$l. each were applied to a carefully cleaned object glass within paraffin rings of 10 mms. in diameter. After evaporation of the solvent, 50 $\mu$l. of water was applied in drops within each ring. This quantity of water contained about 500 sporules of the fungus *Fusarium culmorum* or of the fungus *Glomerella cingulata*, as well as a small quantity of cherry extract so that 1000 parts of the sporule suspension contained 1 part of dry substance of this cherry extract. The object glasses were kept in a moist space at 23° C. for 16 hours, after which the percentage of germinated sporules was determined by microscopic observation. As a standard for the fungicidal effect that concentration of the test substance (calculated on the basis of the volume of 50 $\mu$l. of aqueous germinating medium) at which 50% of the sporules did not germinate (LD 50) was assured. When this concentration was more than 10 mg./l. (i.e. more than $10^{-5}$ mg./l.), the substance concerned received the symbol "—."

If LD 50 was between 10 and 3.15 mg./l. ($10^{-5}$ and $10^{-5.5}$ mg./l.) the symbol "+" was given. In a corresponding manner the symbol "++" is associated with a concentration range of 3.15 to 1 mg./l. ($10^{-5.5}$ to $10^{-6}$ mg./l.), the symbol "+++" to a concentration range of 1 to 0.315 mg./l. ($10^{-6}$ to $10^{-6.5}$ mg./l.) and the symbol "++++" to an LD 50 of less than 0.315 mg./l. (The symbol "—" does not mean to say that the substance concerned had no fungitoxical effect: in fact, the only compound referred to in this application and having the denomination "—" (see Table VI) has an LD 50 at 20 mg./l.)

The phytotoxical effect of the compounds according to the invention was determined in tests with indian cress (*Tropaeolum majus*), garden beans (*Vicia faba*) and bush beans (*Phaseolus vulgaris*). Cut-off leaves were used from the indian cress, which, after having been sprayed, were put by their stems into a flask containing water. 10 cm. high pot plant specimens of the bean plants were tested. The plants were sprayed with a 2% and a 10% solution of the test substance in acetone. The solutions were distributed over the plants by means of a paint syringe in a manner such that 1000 cm.$^2$ of surface was treated with about 10 mls. of solution (for the respective concentrations this corresponds to 300 and 1000/cm.$^2$). After treatment the plants were exposed for five days to the light of "TL" tubes of the day-light type (about 3000 lux) in a relative humidity of about 85% and at a temperature of 22° C., after which the damage to the leaves was determined. The amount of damage was then evaluated according to the following scheme:

0 = entirely undamaged,
1 = 0 to 1/10 damaged,
2 = 1/10 to 1/3 damaged,
3 = 1/3 to 2/3 damaged,
4 = 2/3 to 9/10 damaged,
5 = 9/10 to 1 part damaged,
6 = quite dead.

Then the values were summed up for three plants and two concentrations (maximum attainable sum: 36). The sum being zero, the symbol "—" was given for the phytotoxicity. When the sum was 1 to 6, "±" was given the sum 7 to 12, the symbol "+" and when the sum was 13 or more, the symbol "++" was given. (The sym-

EXAMPLE I

*Trichloromethyl-p-fluoroacetamino-benzene thiolsulphonate*

20.0 gs. of α-fluoroacetanilide were added in spoonfuls, while stirring, to 50 mls. of chlorosulphonic acid, the reaction temperature being kept below 10° C. Then the mixture was heated at 50° C. for one hour. After pouring out on ice, 24.0 gs. (70%) of p-(α-fluoroacetamino)-benzene sulphonchloride (melting point 130° C. to 132° C.) were obtained. This substance was suspended at a temperature of 30° C. to 40° C. in a solution of 37 gs. of sodium sulphite (7 aq.) in 80 mls. of water. By the controlled addition of sodium bicarbonate the mixture was kept neutral during the reaction. After the whole quantity of sulphochloride had been dissolved, the mixture was cooled and acidified with sulphuric acid (1:2). 19.3 gs. (88%) of p-(α-fluoroacetamino)-benzene sulphinic acid were obtained in an equivalent weight of 218.4 (calculated 217.2). 19.3 gs. of sulphinic acid, after being dissolved in an equivalent quantity of 2 N caustic soda, were shaken at room temperature with 10.0 mls. of perchloromethyl-mercaptan. The precipitated trichloromethyl - p - fluoroacetamino - benzene thiolsulphonate was filtered off and washed with water. Yield 18.0 gs. (55%), melting point after dissolving in benzene and precipitation with petroleum ether 159 to 160° C.

EXAMPLE II

*Trichloromethyl - p - chloroacetamino - benzene thiolsulphonate*

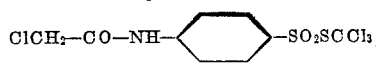

24.5 mls. of chloroacetyl-chloride were added, in drops, to a solution of 31.5 gs. of p-amino benzene sulphinic acid in 33 mls. of 2 N caustic soda, while stirring, at —10 to 0° C. Then the reaction mixture was acidified carefully with 60 mls. of sulphuric acid (1:1). The crystalized p-(α-chloroacetamino)-benzene sulphinic acid was filtered off and dried. Yield: 29.0 gs. (62%)+; equivalent weight: 234.2 (calculated 233.7). 9.0 gs. of this sulphinic acid were dissolved in an equivalent quantity of 2 N caustic soda. The solution obtained was evaporated to dryness. The residual dry sodium salt (9.9 gs.) of the p-(α-chloroacetamino)-benzene sulphinic acid was suspended in 80 mls. of absolute benzene and after the addition of 3.5 mls. of perchloromethyl-mercaptan, while stirring, it was refluxed for two hours. The reaction mixture was filtered while hot. After evaporation of the filtrate in vacuo, 6.4 gs. (43%) of crude trichloromethyl - p - (α - chloracetamino) - benzene thiolsulphonate were obtained, which, after dissolving in ethyl acetate and precipitating with petroleum ether (boiling point 40 to 60° C., melted at 106° to 107° C.

EXAMPLE III

*Trichloromethyl - p - (α - trimethyl - chloramino - acetamino) benzene thiolsulphonate*

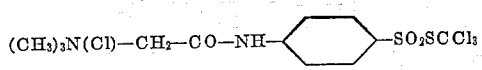

To a solution of 10.0 gs. of p-(α-chloroacetamino)-benzene sulphinic acid in 165 mls. of 90% acetone 100 mls. of about a 35% solution of trimethylamine in acetone were added. A crystalline deposit was obtained, which, after addition of 100 mls. of water and cooling to 0° C., was filtered off and dried. 10.1 gs. (76%) of p-(α-trimethylchloramino-acetamino)-benzene sulphinic acid (trihydrate) were obtained, which, after recrystallization from water, melted at 219 to 220° C., with decomposition taking place. 4.5 gs. of this sulphinic acid were dissolved in 200 mls. of 10% aqueous sodium chloride solution and shaken at room temperature with 1.8 mls. of perchloromethyl-mercaptan. The crystalline product was separated off, which, after filtering and drying, consisted of 6.3 gs. (94%) of trichloromethyl-p - (α - trimethylchloramino - acetamino) - benzene - thiosulphonate. After recrystallization from water, this compound melted at 193 to 195° C. with decomposition.

EXAMPLE IV

*Trichloromethyl - p - (β - carboxy - propionylamino) benzene thiolsulphonate*

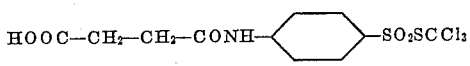

13.3 gs. of succino-aldehydic acid-monoanilide were added in spoonfuls at 25 to 30° C. to 66 mls. of chlorosulphonic acid. The mixture was poured out on ice after two hours' heating at 60° C. A precipitate of 26.3 gs. (90%) of crude β-carboxy propionylamino-benzene sulphochloride was obtained. 20 gs. of this sulphochloride were reduced in the manner described in Example I at 30 to 40° C. with a solution of 26.0 gs. of sodium sulphite (7 aq.) in 80 mls. of water, while 16 gs. of 50% aqueous caustic soda solution were slowly added. After acidification of the reaction mixture with 40 gs. of 50% aqueous sulphuric acid solution, 16.6 gs. (81%) of p-(β-carboxy-propionylamino)-benzene sulphinic acid crystallized out. This compound was dissolved in two equivalent weights of diluted caustic soda and after the addition of one equivalent of diluted hydrochloric acid it was shaken with 7.0 mls. of perchloromethyl-mercaptan. Thus 15 gs. (57%) of the desired thiolsulphonate was obtained. After dissolving in ethyl acetate and precipitation with petroleum ether the compound melted at 141 to 142° C.

EXAMPLE V

*Trichloromethyl - p - (α - carbethoxy - acetamino) benzene thiolsulphonate*

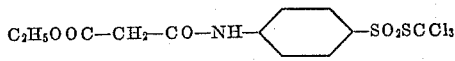

24.5 gs. of α-carbethoxy acetanilide were added slowly, while cooling and stirring, at 25° C., to 82 mls. of chlorosulphonic acid. Then the reaction mixture was heated at 30 to 35° C. for one and a half hours and then poured out on ice. The sulphochloride which soon separated out, by crystallization, had a weight of 22.5 gs. (62%), after filtering and drying and melted at 60 to 80° C. 21.5 gs. of this crude sulphochloride were converted in the manner described in Example I by reduction with a solution of 35 gs. of sodium sulphite (7 aq.) in 100 mls. of water, while gradually adding 9 gs. of sodium bicarbonate, into p-(α-carbethoxy-acetamino)-benzene sulphinic acid. Yield 16.2 gs. (85%); melting point: 78 to 83° C. 15.0 gs. of this sulphinic acid were dissolved in an equivalent quantity of diluted, aqueous caustic soda solution and shaken at room temperature with 6.1 mls. of perchloromethyl-mercaptan. Thus 19.1 gs. (82%) of trichloromethyl-p-(α-carbethoxy-acetamino) benzene thiolsulphonate were obtained, which, after being dissolved in benzene and precipitation with petroleum ether, melted at 98 to 100° C.

EXAMPLE VI

*Trichloromethyl - p - (β - carbethoxy - propionylamino) benzene thiolsulphonate*

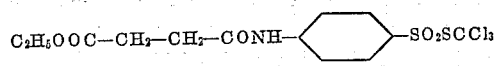

10 gs. of β-carbethoxy-propionylanilide was added slowly at room temperature, while stirring and cooling, to 30 mls. of chlorosulphonic acid.

Then the mixture was heated at 30 to 35° C. for one and a half hours and then the mixture was poured out on ice. The isolated sulphochloride was mixed with diethyl ether. The ethereal solution was washed with water and bicarbonate. After drying and evaporation of the ether, 6.1 gs. (42%) of crude β-carbethoxy-propionylamino-benzene sulphochloride (melting point 108 to 117° C.) remained.

This substance was converted in the manner described in Example I by reduction with a solution of 7.1 gs. of sodium sulphite (7 aq.) and 2.4 gs. of sodium bicarbonate in 20 mls. of water, into the corresponding sulphinic acid. Yield 4.5 gs. (76%): melting point 110 to 112° C. 3.75 gs. of this sulphinic acid were dissolved in the calculated quantity of diluted caustic soda and by shaking it with 1.6 mls. of perchloromethyl-mercaptan in the manner described above it was converted into 5.1 gs. (89%) of trichloromethyl-p-(β-carbethoxy-propionylamino) benzene thiolsulphonate. The melting point, after recrystallization from a mixture of equal parts of benzene and petroleum ether was 122 to 124° C.

EXAMPLE VII

*Trichloromethyl-p-N phenyl-succinimide thiolsulphonate*

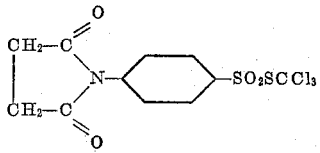

13 gs. of N phenyl-succinimide were chlorosulphonated and the crude sulphochloride was reduced with a solution of 37.5 gs. of sodium sulphite (7 aq.) and 12.5 gs. of sodium bicarbonate in 100 mls. of water. By acidification of the obtained reduction mixture with 70 gs. of 45% aqueous sulphuric acid solution, 6.1 gs. (34%) of N phenyl succinimide sulphinic acid were obtained. Equivalent weight: 238 (calculated 235.3). 5.8 gs. thereof were dissolved in the calculated quantity of 2N caustic soda solution and by shaking it with 2.7 mls. of perchloromethyl-mercaptane it converted into 8.5 gs. (80%) of trichloromethyl-p-N phenyl succinimide thiosulphonate. Melting point after recrystallization from benzene and petroleum ether: 173 to 176° C.

EXAMPLE VIII

*Trichloromethyl-p-(α-phenoxy-acetamino) benzene thiolsulphonate*

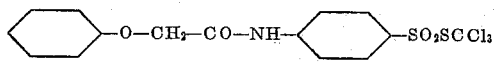

5.0 mls. of phenoxy-acetylchloride were added dropwise, while stirring, at about 5° C., to a solution of 5.2 gs. of p-amino benzene sulphinic acid in 50 mls. of 2 N caustic soda solution. The deposit, obtained during this addition, was filtered off and recrystallized from 150 mls. of alcohol, while diethyl ether was being added. Yield: 5.1 gs. (50% of sodium salt of p-(phenoxy-acetamino) benzene sulphinic acid. 4.4 gs. of this compound were treated in the manner described in Example II in 80 mls. of absolute benzene with 1.7 mls. of perchloromethyl-mercaptan. From the reaction mixture, which was filtered while hot, 5.0 gs. (88%) of trichloromethyl-p-(phenoxy-acetamino) benzene thiolsulphonate, crystallized out. After recrystallization from benzene, the product melted at 107 to 108.5° C.

TABLE I

Compounds of the general formula:

| $R_1$ | Example | Fungi-toxicity | Phyto-toxicity |
|---|---|---|---|
| FCH$_2$— | I | +++ | ± |
| ClCH$_2$— | II | ++ | ± |
| (CH$_3$)$_3$N.CH$_2$— $\mid$ Cl | III | + | — |
| HOOC—CH$_2$—CH$_2$— | IV | ++ | — |
| C$_2$H$_5$O$_2$C.CH$_2$— | V | ++ | — |
| C$_2$H$_5$OOC—CH$_2$CH$_2$— | VI | ++ | — |
| ⟨phenyl⟩—OCH$_2$— | VIII | + | — |

TABLE IA

| Compound | Example | Fungi-toxicity | Phyto-toxicity |
|---|---|---|---|
|  | VII | ++++ | ∓ |

EXAMPLE IX

*Trichloromethyl-p-(β-ethoxy-ethoxy) benzene thiolsulphonate*

$$C_2H_5O—C_2H_4—O—\langle\text{phenyl}\rangle—SO_2SCCl_3$$

15 gs. of β-ethoxy-phenetol were added dropwise at 0 to 5° C. to 27 mls. of chlorosulphonic acid; then the mixture was heated at 35 to 40° C. for half an hour. The reaction mixture was poured out on ice and the precipitated sulphochloride was isolated by extraction with diethyl ether. Yield 11 gs. (46%) of a colorless oil. By reduction with a solution of 24 gs. of sodium sulphite (7 aq.) in 60 mls. of water, while adding 10 gs. of sodium bicarbonate, this oil was converted at 40 to 50° C. into 7.1 gs. (74%) of p-β-ethoxy-ethoxy-benzene sulphinic acid having a melting point of 56 to 60° C. The sulphinic acid produced was dissolved in an equivalent quantity of 1 N caustic soda solution and converted in the manner described above with 3.25 mls. of perchlormethyl-mercaptan into 9.5 gs. (81%) of trichlormethyl-p-(β-ethoxy-ethoxy) benzene thiolsulphonate, which, after recrystallization from diluted aqueous ethanol, melted at 65.5 to 67.5° C.

EXAMPLE X

*Trichloromethyl-p-(β-butoxy-ethoxy) benzene thiolsulphonate*

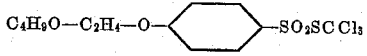

9.65 gs. of β-butoxy-phenetol were added dropwise at 0 to 50° C. while stirring, to 16.5 mls. of chlorosulphonic acid. The stirring was continued at room temperature for half an hour. The reaction mixture was then poured out on ice, the p-(β-butoxy-phenetol) sulphochloride separating out in the form of a viscous oil. By extraction with diethyl ether 6.5 gs. (45%) of the sulphochloride was isolated. This compound was reduced at room temperature by suspending it in a solution of 8.6 gs. of sodium sulphite (7 aq.) in 50 mls. of water, gradually adding 4.3 gs. of sodium bicarbonate. After the whole quantity of the sulphochloride had been dissolved, the mixture was shaken with 2.0 mls. of perchlormethyl-mercaptan. The oil obtained was separated out by extraction from diethyl ether. Thus 5.5 gs. (61%) of trichloromethyl-p-(β-butoxy-ethoxy) benzene thiolsulphonate were obtained in the form of a viscous oil.

EXAMPLE XI

*Trichloromethyl-p-(β,β'-ethoxy-ethoxy-ethoxy) benzene thiolsulphonate*

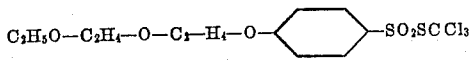

10.5 gs. of β,β'-ethoxy-ethoxy-phenetol were added dropwise at 0 to 5° C., while stirring, to 16.5 mls. of chlorosulphonic acid. Then the mixture was stirred at room temperature for half an hour. The mixture was then poured out on ice and the crude sulphochloride was obtained in the form of a colorless oil by extraction with diethyl ether. The yield was 9.2 gs. (60%). 12.7 gs. of the sulphochloride were then reduced with a solution of 21.6 gs. of sodium sulphite (7 aq.) and 6.7 gs. of sodium bicarbonate in 100 mls. of water in the manner described above (Example I). The clear sulphinate solution obtained was shaken with 6 mls. of perchloromethyl-mercaptan. 10.5 gs. (60%) of trichloromethyl-p-(β,β'-ethoxy-ethoxy-ethoxy) benzene thiolsulphonate was separated out. After recrystallization from equal parts of ethanol and water, it melted at 51 to 53° C.

EXAMPLE XII

*6-Trichloromethyl-thiolsulphonyl-benzodioxane*

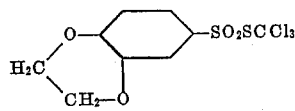

By reduction of 8.5 gs. of benzodioxane-6-sulphochloride with 14 gs. of sodium sulphite (7 aq.) in 30 mls. of water in the manner described above (Example I) 6.9 gs. (95%) of benzodioxane-6-sulphinic acid were obtained. (Melting point 70 to 74° C.) After dissolving in an equivalent quantity of ½ N-aqueous caustic soda solution, and by shaking it with 3.7 mls. of perchloromethyl-mercaptan it was converted into 9.3 (78%) of 6-trichloromethyl-thiolsulphonyl-benzo di oxane. The melting point when crystallized from ethanol was 85 to 86° C.

TABLE II

Compounds of the general formula $$R_2O(R_3O)_m \text{—}\bigcirc\text{—}SO_2SCCl_3$$

| $R_2O(R_3O)_m$— | Example | Fungi-toxicity | Phyto-toxicity |
|---|---|---|---|
| $C_2H_5$—$OC_2H_4$— | IX | ++++ | ± |
| $C_4H_9OC_2H_4O$— | X | +++ | ± |
| $C_2H_5OC_2H_4OC_2H_4O$— | XI | ++++ | ± |
| 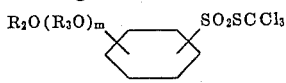 | XII | ++++ | ± |

EXAMPLE XIII

*Trichloromethyl-p-(β-carboxy-ethylene) benzene thiolsulphonate*

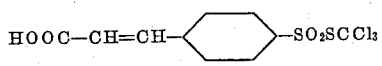

26.3 gs. of p-(β-carboxy-ethylene) benzene sulphinic acid were dissolved in the form of the mono-sodium salt, in about 500 mls. of water and treated in the above described manner with 13.5 mls. of perchloromethyl mercaptane. 33.5 gs. (75%) of trichloromethyl-p-(β-carboxy-ethylene) benzene thiolsulphonate (melting point 189 to 189.5° C.) were obtained.

EXAMPLE XIV

*Trichloromethyl-p(β-carboxy-ethyl) benzene thiolsulphonate*

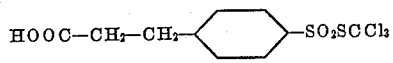

3.9 gs. of β-phenyl-propionic acid were added in spoonfuls, while stirring, to 12 mls. of chlorsulphonic acid at 10° C. After two hours' heating at 60° C. the reaction mixture was poured out on ice; thus 4.9 gs. (65%) of β-carboxy-ethyl-benzene sulphochloride were obtained. Without further purification this compound was reduced with a solution of 7.5 gs. of sodium sulphite (7 aq.) in 20 mls. of water, while 4.7 gs. of 50% aqueous caustic soda solution were gradually added. This reaction solution was then acidified with 30% aqueous sulphuric acid. The sulphinic acid was then isolated by repeated extraction from diethyl ether. The yield was 2.58 gs. (61%) with a melting point of 143 to 144° C. 2.3 gs. of this sulphinic acid were dissolved in two equivalent quantities of 2 N caustic soda solution and, after the addition of one equivalent quantity of 2 N hydrochloric acid, were shaken with 1.2 mls. of perchlormethyl-acid. The isolated thiolsulphonate had, after filtering off and drying, a weight of 3.26 gs. (83%) and melted, after recrystallization from benzene and a mixture of equal parts of petroleum ether, at 118 to 120° C.

EXAMPLE XV

*Trichloromethyl-p-ethyl-carboxymethyl-benzene thiolsulphonate*

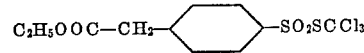

1 mol of phenyl-acetic acid ethyl ester was added slowly at 25° C. to 5 mols of chlorosulphonic acid. The mixture was stirred at 25° C. for one hour and then poured out on ice. The p-ethyl-carboxymethyl-benzene sulphochloride separated out in the form of an oil. The yield was 30%. 1 mol of the p-ethyl-carboxymethyl-benzene sulphochloride was then suspended, while stirring, at 25° C. in an aqueous solution of 1.5 mols of sodium sulphite. To the suspension slightly more than 1 mol of sodium bicarbonate was added in spoonfuls, the sulphochloride being slowly dissolved. Then the reaction mixture was acidified with sulphuric acid (1:2), the p-ethyl-carboxymethyl-benzene sulphinic acid being separated out in the form of an oil, which was isolated by extraction with diethyl ether. The yield was 72%.

This sulphinic acid was dissolved in the calculated quantity of aqueous lye and shaken with an equivalent quantity of perchloromethyl-mercaptan. The resultant trichloromethylthiolsulphonate was then separated out in the form of a colorless oil, which was isolated by extraction from diethyl ether. The yield was 77%. The index of refraction was $n_D^{20}=1.5696$.

EXAMPLE XVI

*Trichloromethyl-p-carboxymethyl-benzene thiolsulphonate*

To 9.8 gs. of the p-ethyl-carboxymethyl-benzene sulphinic acid, described in the preceding example, was added an aqueous solution of 3.4 gs. of sodium hydroxide. The mixture was boiled for one and a half hours. The solution obtained was neutralized with diluted hydrochloric acid and then shaken with 4.7 mols perchloromethyl-mercaptan. Thus a substantially clear solution was produced which, by extraction with diethyl ether, was freed from unconverted perchloromethyl-mercaptan. The aqueous layer was then acidified with 45 mls. of 2 N sulphuric acid; 10 gs. (66%) of trichloromethyl-p- carboxymethyl-benzene thiolsulphonate were separated out in the form of a colorless oil. This compound had an index of refraction of $n_D^{20}=1.5741$.

TABLE III

Compounds of the general formula

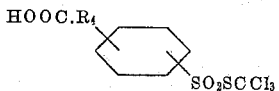

or esters thereof.

| HOOC.R₄ | Example | Fungi-toxicity | Phyto-toxicity |
|---|---|---|---|
| HOOC.CH=CH— | XIII | ++++ | ± |
| HOOC.CH₂CH₂— | XIV | ++++ | ± |
| C₂H₅OOC.CH₂— | XV | +++ | ++ |
| HOOC.CH₂— | XVI | ++++ | ++ |

EXAMPLE XVII

*Trichloromethyl-p-carbamyl-benzene thiolsulphonate*

To a solution of 23.4 gs. of p-carboxy-chloride benzene sulphochloride in 240 mls. of diethyl ether was added dropwise, while stirring, at 0 to 5° C., 14.6 mls. of 25% aqueous ammonia. The white deposit thus obtained was filtered off, washed with water and dried. 20.1 gs. (93%) of p-carbamyl benzene sulphochloride (melting point 150 to 170° C., with decomposition) were obtained.

This sulphochloride was reduced by suspending it in a solution of 45 gs. of sodium sulphite (7 aq.) in 100 mls. of water, while gradually adding 11.5 gs. of sodium bicarbonate. The p-carbamyl-benzene sulphochloride was dissolved while carbon dioxide was developed. After the termination of the reaction, the reaction mixture was acidified with 60% sulphuric acid. A precipitate of p-carbamyl-benzene sulphinic acid was obtained, which after having been filtered off, was dissolved in the calculated quantity of 0.5 N caustic soda solution and after the addition of 2.5 gs. of sodium bicarbonate the mixture was shaken at room temperature with 9.8 mls. of perchloromethyl - mercaptane. The precipitated trichloromethyl-p-carbamyl-benzene thiolsulphonate had, after filtering, washing and drying, a weight of 24.5 gs. (81%, calculated on sulphochloride) and melted, after recrystallization from benzene, at 148 to 150° C.

EXAMPLE XVIII

*Trichloromethyl-p-(N-methylcarbamyl) benzene thiolsulphonate*

17.35 gs. of p-carboxy-chloride benzene sulphochloride were treated in a diluted ethereal solution at 0 to 5° C. with 4.5 gs. of methyl amine dissolved in diethyl ether.

After 10 hours' stay at room temperature, the reaction mixture was washed with water and diluted hydrochloric acid. After drying and evaporation 15 gs. of crude p-N-methylcarbamylbenzene sulphochloride were obtained. This compound was suspended in an aqueous solution of 31 gs. of sodium sulphite. To the suspension 8 gs. of sodium bicarbonate was added. After the whole quantity of sulphochloride had been dissolved, the sulphinic acid was precipitated with sulphuric acid (1:1). The yield was 12.5 gs. (100%). 11 gs. of this sulphinic acid where dissolved in the calculated quantity of aqueous caustic soda solution and shaken with 6.2 mls. of perchloromethyl-mercaptan. Thus 16 gs. (71%) of trichloromethyl-p-N-methylcarbamyl) - benzene thiolsulphonate were precipitated. The melting point, after recrystallization from a mixture of equal parts of benzene and petroleum ether was 111 to 114° C.

EXAMPLE XIX

*Trichloromethyl-p-(NN-dimethyl) carbamyl-benzene thiolsulphonate*

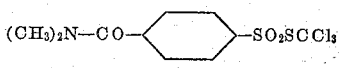

In the manner described in the preceding example, by treating 16 gs. of p-carboxy chloride benzene sulphochloride with dimethyl amine in an ethereal solution, 11 gs. (67%) of crude p-NN-dimethylcarbamyl-benzene sulphochloride (about 100° C. melting point) were obtained. 16 gs. of this sulphochloride were converted by reduction with 32 gs. of sodium sulphite in water into the sulphinic acid. The reaction mixture obtained was shaken immediately with 7 mls. of perchloromethyl-mercaptan. A viscous oil was separated out, which gradually crystallized. After filtering it off, 12 gs. (52%) of crude trichloromethyl-p-(NN-dimethylcarbamyl)-benzene thiolsulphonate were obtained. The melting point, after recrystallization from a mixture of equal parts of benzene and petroleum ether was 95 to 100° C.

TABLE IV

Compounds of the general formula

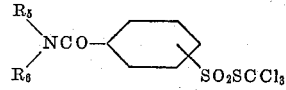

| R₅ | R₆ | Example | Fungitox. | Phytotox. |
|---|---|---|---|---|
| H | H | XVII | +++ | ± |
| H | CH₃ | XVIII | +++ | + |
| CH₃ | CH₃ | XIX | +++ | + |

EXAMPLE XX

*Trichloromethyl-β-phenoxy-ethane thiolsulphonate*

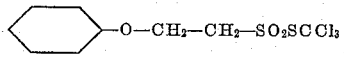

20.0 gs. of β-phenoxy-ethyl chloride were refluxed with a solution of 33 gs. of sodium sulphite (7 aq.) in 500 mls. of water for two hours. The reaction mixture was extracted once with diethyl ether in order to remove any unconverted phenoxy-ethylchloride. Then it was evaporated to dryness. The residue was extracted from boiling in ethanol. After evaporation of the methanolic solution, 28.5 gs. (100%) of the sodium salt of β-phenoxy ethane sulphonic acid were obtained. 9.5 gs. of this sulphonic acid were mixed with 10.0 gs. of phosphorus pentachloride and after quieting the resultant violent reaction, the mixture was refluxed on the steam bath for one and a half hours. After cooling the reaction mixture was poured out on ice; the precipitated β-phenoxy-ethane sulphochloride was separated out by extracting it from diethyl ether. The yield was 7.5 gs. (80%) with a melting point of 38 to 40° C.

7.5 gs. of β-phenoxy-ethane sulphochloride were converted at 40° C. with a solution of 11.0 gs. of sodium sulphite (7 aq.) in 250 mls. of water while adding gradually 6 gs. of sodium bicarbonate, into the corresponding sulphinic acid. The clear solution obtained was shaken in the conventional manner at room temperature with 3.7 mls. of perchloromethyl-mercaptan. 9.7 gs. (88%) of trichloromethyl - β - phenoxy - ethane thiolsulphonate (melting point 107 to 109° C.) were obtained.

EXAMPLE XXI

*Trichloromethyl-β-(2-4-dichlorophenoxy) ethane-thiolsulphonate*

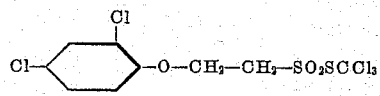

16.7 gs. of β-2,4-dichlorophenoxy-ethyl chloride were converted in the manner described in the preceding example into 12.17 gs. (56%) of β-2,4-chlorphenoxy-ethane sulphonic acid sodium salt. By treating this compound with 8.7 gs. of phosphorus pentachloride, 9.3 gs. of β-2,4-dichlorophenoxy ethane sulphochloride were obtained. This mixture was reduced at 40 to 50° C. with a solution of 16 gs. of sodium sulphite (7 aq.) in 125 mls. of water, while about 7 gs. of sodium bicarbonate were gradually added. The clear sulphinate solution obtained was shaken with 4.0 mls. of perchloromethyl-mercaptane. 9.2 gs. (71%) of trichloromethyl-β-(2,4-dichlorophenoxy)ethane-thiolsulphonate were crystallized out. After recrystallization from ethanol it melted at 109 to 110° C.

EXAMPLE XXII

*Trichloromethyl-β-(2-nitrophenoxy) ethane thiolsulphonate*

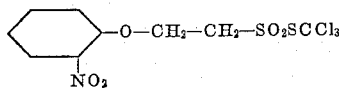

7.0 gs. of β-(2-nitrophenoxy) ethane sulphinic acid were dissolved in an equivalent quantity of an aqueous 0.5 N caustic soda solution and shaken with 3.3 mls. of perchloromethyl-mercaptan. 9.3 gs. (80%) of trichloromethyl-β-(2-nitrophenoxy) ethane thiolsulphonate crystallized out. The melting point was 97 to 99° C. when recrystallized from ethanol.

EXAMPLE XXIII

*Trichloromethyl-(γ-phenoxy) propane thiolsulphonate*

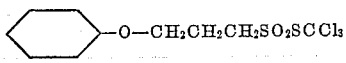

To a solution of 93.72 gs. (0.66 mol) of γ-phenoxy propanol in 52 mls. (0.7 mol) of dry pyridine 87 gs. (0.7 mol.) of thionyl chloride were added dropwise, while stirring and cooling. After the reaction mixture had been kept at room temperature for 14 hours, it was refluxed on a steam bath for one hour. After cooling and pouring out into water, the γ-phenoxy-propyl chloride that formed was extracted with diethyl ether. The ethereal solution was washed in succession with 2N hydrochloric acid, with aqueous sodium bicarbonate solution and with water and then dried on sodium sulphate. After evaporation of the solvent, the residue was fractionated in vacuo. 53.1 gs. (47%) of γ-phenoxy-propyl chloride (boiling point 126 to 128° C./15 mms.) were obtained. A mixture of 20 gs. (0.117 mol percent) of γ-phenoxy-propyl chloride and an aqueous solution of 32.76 gs. (0.13 mol) of sodium sulphite (7 aq.) was refluxed for 54 hours. Then any unconverted γ-phenoxy propyl chloride was removed by extraction with diethyl ether. The aqueous layer was evaporated to dryness on a steam bath. By extraction with boiling methanol, 27.9 gs. (100%) of γ-phenoxy propane sodium sulphonate were obtained from the residue. 7.1 gs. (0.072 mol) of this dry sodium salt was mixed with 15.64 gs. (0.075 mol) of phosphorus pentachloride and refluxed for one and a half hours. After standing for one night at room temperature, the mixture was mixed with ice and the isolated sulphochloride was separated out by extraction from diethyl ether. The yield was 12.66 gs. (75%) of γ-phenoxy-propane sulphochloride (melting point 44 to 46° C.).

11.22 gs. (0.05 mol) of this sulphochloride were suspended in an aqueous solution of 21.6 gs. of sodium sulphite (7 aq.) (0.08 mol). 6.7 gs. (0.08 mol) of sodium bicarbonate was added in spoonfuls at room temperature to this suspension. After the sulphochloride had been completely dissolved, the reaction mixture was filtered and the filtrate was diluted with water to 200 mls. 160 mls. of this solution of the crude sodium salt of γ-phenoxy-propane sulphinic acid was shaken at room temperature with 6.7 (0.035 mol) of perchloromethyl-mercaptan. The colorless oil sepaarting out was isolated by extraction from methylethyl-ketone, so that 8.7 gs. (62%) of trichloromethyl-(γ-phenoxy)-propane thiolsulphonate were obtained in the form of a colorless oil, which, after having been kept for sometime, crystallized and after recrystallization from petroleum ether melted at 51 to 52° C.

EXAMPLE XXIV

*Trichloromethyl-β-(p-nitrophenoxy) ethane thiolsulphonate*

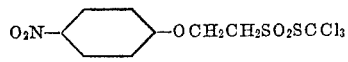

In the manner described in Example XXIII 28.81 gs. (56%) of β-(p-nitrophenoxy)-ethylchloride (melting point 55 to 57° C.) were obtained from 45.8 gs. (0.25 mol) of β-p-nitro-phenoxy-ethanol by dissolving it in 100 mls. of dry pyridine and by treating it with 37.2 gs. (0.3 mol) of thionyl chloride. 28.23 gs. (0.14 mol) of β-(p-nitro-phenoxy) ethylchloride were then converted in the manner described in the preceding example by boiling for a long time with a solution of 37.8 gs. (0.15 mol) of crystalline sodium sulphite in 500 mls. of water into 14.43 gs. (38%) of the sodium salt of β-(p-nitrophenoxy) ethane sulphonic acid, while 10.4 gs. (37%) of unconverted β-(p-nitrophenoxy) ethylchloride were obtained. From 13.46 gs. (0.05 mol) of this sodium sulphonate 4.68 gs. (35%) of β-(p-nitrophenoxy) ethane sulphochloride were obtained by a treatment with 10.42 gs. of phosphorus pentachloride in the manner described in Example XXIII. 4.05 gs. of this sulphonate were converted in the manner described above by reduction with aqueous sulphite, followed by shaking of the filtered reduction mixture with 16 mls. of perchloromethyl-mercaptan, into 0.91 gs. (16%) of trichloromethyl-β-(p-nitrophenoxy) ethane thiolsulphonate. The melting point of this product was 96 to 98° C.

EXAMPLE XXV

*Trichloromethyl-β-(p-methoxy-phenoxy) ethane thiolsulphonate*

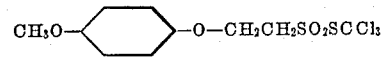

In the manner described in Example XXIII β-(p-methoxyphenoxy) ethanol yielded, via the β-(p-methoxyphenoxy) ethylchloride (42%), melting point 43 to 45° C. and via the β-(p-methoxyphenoxy) ethane sulphonic acid sodium (77%) the β-(p-methoxyphenoxy)ethane sulphochloride with a yield of 75% in the form of a light-brown oil.

7.5 gs. (0.03 mol) of this sulphochloride were reduced in the manner described above with the aid of an aqueous solution of 12.6 gs. crystallized sodium sulphite and with the addition of sodium bicarbonate into the corresponding sulphinic acid. The crude reduction solution obtained was shaken with 2.7 mls. of perchloromethyl-mercaptan after having been filtered. The substantially colorless product obtained was separated off by extraction from diethyl ether. The yield of crude trichloromethyl-β-(p-methoxyphenoxy) ethane thiolsulphonate was 3.54 gs. (32%). The melting point after recrystallization from a mixture of equal parts of benzene and petroleum ether was 85 to 87° C.

EXAMPLE XXVI

*Trichloromethyl-β-(p-toloxy) ethane thiolsulphonate*

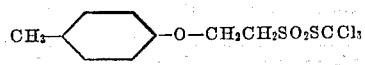

In the manner described in Example XXIII β-(p-toloxy) ethyl chloride was produced with a yield of 55% from β-(p-toloxy) ethanol and thionyl chloride in the presence of pyridine. In the manner described above it was converted via the sulphonic acid sodium (yield 87%) into the β-(-p-toloxy) ethane sulphochloride (yield 79%, melting point 43 to 45° C.). 13.52 gs. (0.058 mol) of this sulphochloride were reduced in the manner described in Example XXIII with an aqueous solution containing 21.6 gs. (0.08 mol) of crystallized sodium sulphite into the sulphinic acid, after which the crude, filtered, reduced solution was shaken with 6.0 mls. (0.055 mol) of perchloromethylmercaptan. The precipitation obtained was filtered and dried. 11.87 gs. (72%) of trichloromethyl-β-(p-toloxy) ethane thiolsulphonate were obtained. After recrystallization from a mixture of equal parts of methanol and water it melted at 89 to 91° C.

EXAMPLE XXVII

Trichloromethyl-β',β-(phenoxy-ethoxy) ethane thiolsulphonate

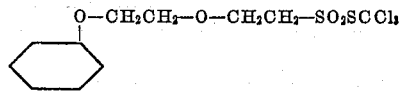

β',β-phenoxy-ethoxy-ethanol was converted in the manner described in Example XXIII via β',β-phenoxy-ethoxy-ethylchloride (yield 52%) and β',β-phenoxy-ethoxy-ethane sulphonic acid sodium (yield 69%) into β',β-phenoxy-ethoxy-ethane sulphochloride (yield 83%), which was obtained in the form of a light-yellow oil. 13.24 gs. of this sulphochloride were reduced with the aid of 21.6 gs. of crystallized sodium sulphite in water with the addition of sodium bicarbonate into the sulphinic acid; then the crude, filtered, reduced solution was shaken with 4.75 mls. of perchloromethyl-mercaptan. The separated viscous oil was extracted with benzene. After evaporation and after having been kept for sometime the residue crystallized (yield 8.75 gs.=51%). After recrystallization from ligroine the substantially pure trichloromethyl-β,β'-(phenoxy-ethoxy) ethane thiolsulphonate melted at 62 to 64° C.

EXAMPLE XXVIII

Trichloromethyl-2-(β-naphthoxy) ethane thiolsulphonate

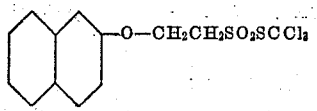

In the manner described in Example XXIII 2-β-naphthoxy ethanol yielded via 2-β-naphthoxy-ethylchloride (yield 44%), melting point 81 to 83° C. and the sodium salt of 2-β-naphthoxy-ethane sulphonic acid (yield 79%), 2-β-naphthoxy-ethane sulphochloride with a yield of 59%, which had a melting point of 84 to 86° C. 8.12 gs. (0.03 mol) of this sulphochloride were reduced in an aqueous medium with 12.6 gs. (0.05 mol) of crystallized sodium sulphite and sodium bicarbonate into the corresponding sulphinic acid salt. The crude, filtered, reduced solution was shaken at room temperature with 2.7 mls. of perchloromethylmercaptan. The separated crystalline substance was filtered off, washed with water and dried. The yield of crude trichloromethyl-2-β-naphthoxy-ethane thiolsulphonate was 9.34 gs. (80%). Its melting point, after recrystallization from a mixture of equal parts of methanol and water was 104 to 106° C.

TABLE V

Compounds of the general formula $R_7ArOR_8SO_2SCCl_3$:

| $R_7$ | Ar | $R_8$ | Example | Fungitox. | Phytotox. |
|---|---|---|---|---|---|
| H | $C_6H_4$ | $-CH_2-CH_2-$ | XX | ++++ | — |
| 2,4 dichloro | $-C_6H_3-$ | $-CH_2-CH_2-$ | XXI | ++++ | — |
| 2 $NO_2$ | $-C_6H_4-$ | $-CH_2-CH_2-$ | XXII | +++ | — |
| H | $-C_6H_4-$ | $-CH_2-CH_2-CH_2-$ | XXIII | ++++ | ± |
| 4 $NO_2$ | $-C_6H_4-$ | $-CH_2-CH_2-$ | XXIV | ++++ | ± |
| 4 $CH_3O$ | $-C_6H_4-$ | $-CH_2-CH_2-$ | XXV | ++++ | ± |
| 4 $CH_3$ | $-C_6H_4-$ | $-CH_2-CH_2-$ | XXVI | ++++ | ± |
| H | $-C_6H_4$ | $-CH_2CH_2OCH_2CH_2-$ | XXVII | ++++ | ± |
| H | $-C_{10}H_6$ | $-CH_2-CH_2-$ | XXVIII | ++ | — |

EXAMPLE XXIX

Trichloromethyl-p-toluene sulphonyl disulphide

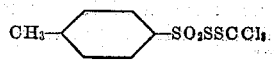

A solution of 12.5 gs. of potassium hydroxide in 25 mls. of water was saturated with hydrogen sulphide at room temperature. While stirring, at 20 to 25° C., 19.05 gs. of p-toluene sulphochloride were added in spoonfuls to this solution.

The potassium salt of p-toluene thiolsulphonic acid crystallized spontaneously. The yield was 15.3 gs. (68%).

To a solution of 2.26 gs. of this salt in 20 mls. of water a small quantity of sodium bicarbonate was added and then 1.0 ml. of perchloromethylmercaptan.

The resultant mixture was shaken vigorously for a few minutes. The trichloromethyl-p-toluene sulphonyl disulphide separated out in the form of a colorless oil, which was isolated by extraction with diethyl ether. The yield was 2.85 gs. (85%); sulphur content was found to be 28.55%, calculated 28.44%.

EXAMPLE XXX

Trichloromethyl-2,4-dimethyl-benzene sulphonyl disulphide

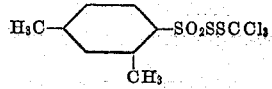

In the manner described in the preceding example a solution of 12.5 gs. KOH in 25 mls. of water, saturated with hydrogen sulphide, and of 2.4 gs. of 2,4-dimethyl benzene sulphochloride yielded 10.7 gs. (45%) of the potassium salt of 2,4-dimethyl benzene thiolsulphonic acid (melting point 232° C., with decomposition).

9.6 gs. of this potassium thiolsulphonate were converted in the manner described in the preceding example in 80 mls. of water with 4.0 mls. of perchloromethyl-mercaptan into the desired trichloromethyl-2,4-dimethyl-benzene sulphonyl disulphide which was obtained in the form of a colorless oil. The yield was 11.5 gs. (82%). Chlorine content: found 30.17%, calculated 30.25%.

EXAMPLE XXXI

Trichloromethyl-p-chlorobenzene sulphonyl-disulphide

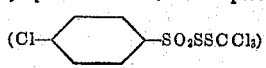

14.6 gs. (59%) of p-chlorobenzene potassium thiosulphonate were obtained from 21.1 gs. of p-chlorobenzene sulphochloride and a solution of 12.5 gs. of potassium hydroxide in 25 mls. of water saturated with hydrogen sulphide (melting point 227° C.).

9.5 gs. (88%) of trichloromethyl-p-chlorobenzene sulphonyl were obtained from a solution of 7.4 gs. of this thiosulphonic acid potassium salt in 60 mls. of water and 3.0 mls. of perchloromethyl-mercaptan, which after recrystallization from ethanol, melted at 48 to 50° C. The production thereof was carried out in the manner described in Example XXIX. Chlorine content: found 39.0%; calculated 39.6%.

EXAMPLE XXXII

*Trichloromethyl-p-methoxy-benzene sulphonyl disulphide*

(CH₃O—⟨ ⟩—SSCCl₃)

18.8 gs. (41%) of p-methoxy-benzene potassium thiosulphonate (melting point 212 to 214° C.) were obtained from 39.1 gs. of p-methoxy-benzene sulphochloride and a solution of 23.75 gs. of potassium hydroxide in 50 mls. of water, saturated with hydrogen sulphide.

9.0 gs. (85%) of trichloromethyl-p-methoxy-benzene sulphonyl disulphide in the form of a light-yellow oil were obtained from a solution of 7.26 gs. of this thiosulphonic acid salt in 60 mls. of water and 3.0 mls. of perchloromethyl-mercaptan.

Chlorine content: found 30.16%, calculated 30.12%.

The method was carried out in the manner described in Example XXIX.

EXAMPLE XXXIII

*Trichloromethyl-p-acetaminobenzene sulphonyl disulphide*

(CH₃CONH—⟨ ⟩—SO₂SSCCl₃)

23.3 gs. of p-acetaminobenzene sulphochloride were suspended at room temperature in 50 mls. of water, after which a solution of 12.5 gs. of potassium hydroxide in 25 mls. of water, saturated with hydrogen sulphide were added, drop by drop, while stirring. After the termination of the reaction a saturated, aqueous, potassium chloride solution was added; however, no potassium thiosulphonate crystallized out. The solution was then caused to react with 7 mls. of perchloromethyl-mercaptan while stirring vigorously. A crystalline precipitation of trichloromethyl-p-acetaminobenzene sulphonyl disulphide was obtained. Yield 12.3 gs. (32%) with respect to sulphochloride. The melting point, after recrystallization from a mixture of equal parts of benzene and petroleum ether was 142 to 144° C.

EXAMPLE XXXIV

*Trichloromethyl-m-carboxy-benzene-sulphonyl disulphide*

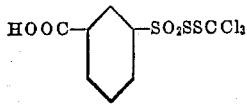
HOOC—⟨ ⟩—SO₂SSCCl₃

10.8 gs. of m-carboxybenzene sulphochloride were added in spoonfuls at room temperature, while stirring, to a solution of 12.5 gs. of potassium hydroxide in 25 mls. of water, saturated with hydrogen sulphide. After the termination of the reaction the mixture was saturated with potassium chloride. However, no potassium thiosulphonate crystallized out.

From the reaction solution obtained (total volume 200 mls.), 150 mls. were shaken with potassium bicarbonate until a pH of 8 was obtained with 6 mls. of perchloromethyl-mercaptan.

A crystalline precipitation of 5.6 gs. (38%) of trichloromethyl-m-carboxybenzene sulphonyl disulphide were obtained, which, after recrystallization from a mixture of equal parts of benzene and petroleum ether, melted at 174 to 176° C.

EXAMPLE XXXV

*Trichloromethyl-2,4,5-trichlorobenzene sulphonyl disulphide*

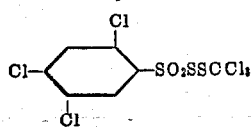

To a suspension of 56 gs. of 2,4,5-trichlorobenzene sulphochloride in 100 mls. of water a solution of 25 gs. of potassium hydroxide in 50 mls. of water, saturated with hydrogen sulphide, was added dropwise at room temperature while stirring.

After the termination of the reaction a saturated, aqueous potassium chloride solution was added to the mixture, after which the precipitation of 2,4,5-trichlorobenzene potassium thiosulphonate was formed off. The yield was 66.7 gs.

15 gs. of this crude potassium thiosulphonate were dissolved in 200 mls. of water and filtered. To the filtrate was added 4.8 mls. of perchloromethyl-mercaptan. 15.4 (83%) of trichloromethyl - 2,4,5-trichlorobenzene-sulphonyl disulphide with a melting point of 91 to 94° C. were obtained.

TABLE VI

Compounds of the general formula $$R_9-\text{⟨ ⟩}-SO_2SSCCl_3$$

| R₉ | Example | Fungitox. | Phytotox. |
|---|---|---|---|
| 4-CH₃ | XX | +++ | ++. |
| 2,4 di-CH₃ | XXX | +++ | ++. |
| 4-Cl | XXXI | +++ | ++. |
| 4-OCH₃ | XXXII | +++ | ++. |
| 4-HNCO.CH₃ | XXXIII | +++ | —. |
| 3-COOH | XXXIV | ++ | —. |
| 2,4,5 tri Cl | XXXV | — | ++. |

EXAMPLE XXXVI

*Trichloromethyl-p-ureido-benzene thiolsulphonate*

H₂NCONH—⟨ ⟩—SO₂SCCl₃

2.34 gs. of p-ureido-benzene sulphochloride were reduced in the manner described in Example I with a solution of 3.8 gs. of sodium sulphite (7 aq.) in 10 mls. of water at 40° C., and 1.3 gs. of sodium bicarbonate while stirring. The clear solution obtained was shaken immediately with 1.1 mls. of perchloromethylmercaptan. The trichloromethyl-p-ureibenzene-thiolsulphonate precipitated was filtered off and dried. The yield was 1.1 gs. (31%), calculated on sulphochloride and the melting point was 138 to 139° C. (with decomposition).

EXAMPLE XXXVII

*Trichloromethyl-p-N.N-dimethyl-ureidobenzene thiolsulphonate*

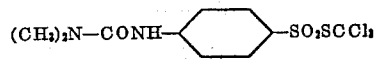
(CH₃)₂N—CONH—⟨ ⟩—SO₂SCCl₃

10.0 gs. of N.N-dimethyl-N'-phenylurea were added slowly, while stirring, at —5 to 0° C., to 20 mls. of chlorosulphonic acid. Then the mixture was heated at 35° C. for half an hour and then poured out on ice. The isolated sulphochloride was filtered off and dried. The yield was 7.25 gs. (45%) and the melting point was 145 to 150° C.

7.25 gs. of the sulphochloride were reduced at 30 to 40° C. with a solution of 10.5 gs. of sodium sulphite (7 aq.) and 4 gs. of sodium bicarbonate in 50 mls. of water. The clear sulphinate solution obtained was shaken with 4.0 mls. of perchloromethyl-mercaptan. 7.95 gs. (74% calculated on sulphochloride) of trichloromethyl-p-N.N-dimethyl-ureido-benzene thiolsulphonate were precipitated. The melting point, after recrystallization from a mixture of equal parts of acetone and water was 132 to 133° C. (with decomposition).

TABLE VII

Compounds of the general formula

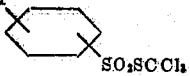

| $R_{10}$ | Example | Fungitox. | Phytotox. |
|---|---|---|---|
| $NH_2$ | XXXVI | +++ | — |
| $N(CH_3)_2$ | XXXVII | ++++ | — |

EXAMPLE XXXVIII

*Trichloromethyl-p-carboethoxyamino-benzene thiolsulphonate*

16.0 mls. of ethylchloroformate were added, while shaking and cooling, to a solution of 26.0 gs. of p-aminobenzene sulphinic acid in 200 mls. of 2 N-caustic soda solution. After the whole quantity of acid chloride had reacted, the reaction mixture was acidified with sulphuric acid (1:2). A crystalline precipitation of 25.1 gs. (66%) of p-carboethoxy-aminobenzene-sulphinic acid was obtained, which, after recrystallization from water, melted at 130 to 139° C.

7.5 gs. of this sulphinic acid were dissolved in the calculated quantity of diluted caustic soda solution and shaken with 3.5 mls. of perchloromethyl-mercaptan. 11.3 gs. (90%) of the sodium salt of trichloromethyl-p-carboethoxy-aminobenzene thiolsulphinic acid crystallized out. The melting point was 86 to 87° C.

EXAMPLE XXXIX

*Trichloromethyl-p-carboisopropoxy amino-benzene thiolsulphonate*

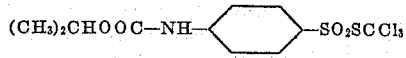

In the manner described in Example XXXVIII 3.95 mls. of isopropyl-chloroformate and a solution of 5.2 gs. of p-aminobenzene sulphinic acid in 40 mls. of 2 N-caustic soda solution yielded 5.1 gs. (63%) of p-carboisopropoxy-aminobenzene sulphinic acid (melting point 110 to 111° C.). This compound was dissolved in the calculated quantity of diluted caustic soda solution and shaken with 2.0 ml. of perchloromethyl-mercaptan. A crystalline precipitation of 6.0 gs. (70%) of the desired thiolsulphonate was obtained. The melting point, after recrystallization from a mixture of equal parts of ethanol and water was 120 to 122° C.

TABLE VIII

Compounds of the general formula

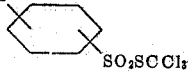

| $R_{11}$ | Example | Fungitox. | Phytotox. |
|---|---|---|---|
| $C_2H_5$ | XXXVIII | ++++ | ± |
| $CH(CH_3)_2$ | XXXIX | ++++ | ± |

EXAMPLE XL

*2-acetamino-4-methyl-5-trichloromethyl-thiolsulphonyl thiazol*

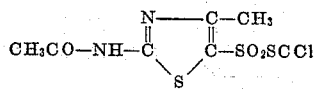

27.5 gs. of 2-acetamino-4-methyl-thiazol-5-sulphochloride were converted by reduction with a solution of 32 gs. of sodium sulphite (7 aq.) and 15 gs. of sodium bicarbonate in 200 mls. of water into 18.4 gs. (77%) of 2-acetamino-4-methyl thiazol-5-sulphinic acid. 9.0 gs. of this sulphinic acid were dissolved with 9 gs. of sodium bicarbonate in 120 mls. of water and shaken with 10 mls. of perchloromethyl-mercaptan. 19.4 gs. (60%) of 2-acetamino-4-methyl-5-trichloromethyl-thiolsulphonyl thiazol were obtained, which, after recrystallization from a mixture of equal parts of ethyl acetate and petroleum ether, melted at 163 to 164° C.

TABLE IX

Compounds of the general formula

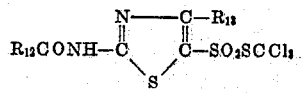

| $R_{12}$ | $R_{13}$ | Example | Fungitox. | Phytotox. |
|---|---|---|---|---|
| $CH_3$ | $CH_3$ | XL | ++++ | — |

EXAMPLE XLI

*Trichloromethyl-p-(N-methylacetamino) benzene thiolsulphonate*

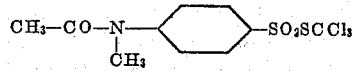

29.0 gs. of p-N-methylacetamino-benzene sulphochloride were reduced in the manner described above at 40° C. with a solution of 58 gs. of sodium sulphite (7 aq.) in 300 mls. of water, while gradually 22.5 gs. of sodium bicarbonate were added. The clear solution obtained was shaken at room temperature with 12.0 mls. of perchloromethyl-mercaptan. The yield was 25.1 gs. (59%) of trichloromethyl-p - N - methyl-acetamino-benzene thiosulphonate, calculated on the sulphochloride. The melting point (after recrystallization from ethanol) was 123 to 124° C.

TABLE X

Compounds of the general formula

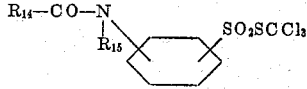

| $R_{14}$ | $R_{15}$ | Example | Fungitox. | Phytotox. |
|---|---|---|---|---|
| $CH_3$ | $CH_3$ | XLI | +++ | — |

EXAMPLE XLII

*p-Trichloromethyl-thiolsulphonyl phenoxy acetic acid*

10.06 gs. of p-sulphino-phenoxy acetic acid ethyl ester were refluxed in a solution of 3.28 gs. of sodium hydroxide in 75 mls. of water for a few hours.

Then the mixture had added to it 20.4 mls. of 2 N hydrochloric acid, after which the solution was shaken with 4.5 mls. of perchloromethyl-mercaptan. The substance was substantially completely dissolved. The reaction mixture was extracted with diethyl ether; then the aqueous layer was acidified with 2 N sulphuric acid. 12.7 gs. (85%) of p-trichloromethyl-thiolsulphonyl phenoxy-acetic acid (melting point 140 to 141° C.) crystallized out.

EXAMPLE XLIII

*p-Trichloromethyl-thiolsulphonyl-phenoxy-acetic acid methyl ester*

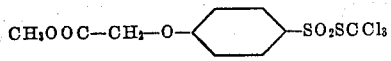

25.0 gs. of phenoxy acetic acid methyl ester were added dropwise at about 20° C. while stirring, to 55 mls. of chlorosulphonic acid, after which the stirring was continued for one hour at 25 to 30° C. The reaction mixture was poured on ice and 33.7 gs. (85%) of p-chlorosulphonyl-phenoxy-acetic acid methyl ester were separated out. The melting point was 63 to 65° C.

20.0 gs. of this sulphochloride were reduced with a solution of 40 gs. of sodium sulphite (7 aq.) and 11 gs. of sodium bicarbonate in 100 mls. of water. After the whole quantity of sulphochloride had been dissolved, the mixture was shaken with 8 mls. of perchloromethyl-mercaptan. 19.1 gs. (66%) of p-trichloromethyl-thiolsulphonyl-phenoxy-acetic acid methyl ester were obtained with a melting point of 40 to 42° C.

EXAMPLE XLIV

*p-Trichloromethyl-thiolsulphonyl-phenoxy acetic acid ethyl ester*

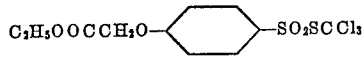

23 gs. of phenoxy acetic acid ethyl ester were added dropwise at 20 to 25° C. to 42 mls. of chloro sulphonic acid. After stirring for one hour at 25° C., the mixture was poured out on ice. 25.8 gs. (73%) of p-chlorosulphonyl phenoxy-acetic acid ester were separated out. The melting point was 38 to 40° C. 3.0 gs. of this sulphochloride were reduced in a solution of 5.5 gs. of sodium sulphite (7 aq.) and 1.4 gs. of sodium bicarbonate in 12 mls. of water until the whole quantity had been dissolved. After acidification with sulphuric acid (1:2), the corresponding sulphinic acid separated out as a colorless oil. The yield was 2.1 gs. (76%); equivalent weight 245.

By dissolving with the calculated quantity of sodium bicarbonate in water and by evaporation of this solution, the sodium sulphinate was obtained. 6.5 gs. of this sodium salt were dissolved in 50 mls. of water and shaken with 2.7 mls. of perchloromethylmercaptan. An oil separated out and isolated by extraction with diethyl ether. After drying and evaporation of the ether, 17.3 gs. (71%) of p-trichloromethyl-thiolsulphonyl-phenoxy-acetic acid ethyl ester were left; after sometime it crystallized. The melting point was 53 to 55° C.

TABLE XI

Compounds of the general formula

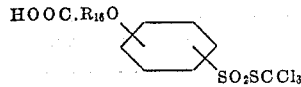

| HOOC.R₁₆— | Example | Fungitox. | Phytotox. |
|---|---|---|---|
| HOOC—CH₂— | XLII | ++ | +. |
| CH₃OOC.CH₂— | XLIII | +++ | +. |
| C₂H₅OOC.CH₂— | XLIV | ++++ | +. |

EXAMPLE XLV

*Trichloromethyl-p-methyl-sulphonyl-amino benzene thiolsulphonate*

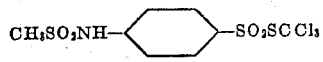

39.5 gs. of methyl-sulphonyl anilide were added in spoonfuls at —5 to 0° C. while stirring, to 92 mls. of chlorosulphonic acid. After stirring for half an hour at 3 to 7° C., the reaction mixture was poured out on ice. A precipitate of 41.5 gs. (67%) of p-methylsulphonyl-amino-benzene sulphochloride was obtained. After recrystallization from a mixture of equal parts of ethyl acetate and petroleum ether, the compound melted at 151 to 152° C. 5.4 gs. of this sulphochloride were reduced at room temperature with a solution of 8 gs. of sodium sulphite (7 aq.) and 3.2 gs. of sodium bicarbonate in 25 mls. of water. The clear sulphinate solution obtained was then shaken with 2.0 mls. of perchloromethyl-mercaptan. 4.23 gs. (55%) calculated on sulphochloride of trichloromethyl-p methyl-sulphonylamino-benzene thiolsulphonate were separated out.

After recrystallization from a mixture of equal parts of ethanol and water, the compound melted at 112 to 114° C.

TABLE XII

Compounds of the general formula

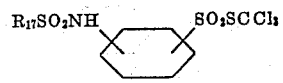

| R₁₇ | Example | Fungitox. | Phytotox. |
|---|---|---|---|
| CH₃ | XLV | ++++ | ±. |

While we have described our invention in connection with specific embodiments and applications, other modifications thereof will be readily apparent to those skilled in this art without departing from the spirit and scope of the invention as defined in the appended claims.

What is claimed is:

1. A method of destroying fungi harmful to plants comprising contacting the plants with a non-phytotoxic pesticidal composition containing a compound corresponding to the general formula:

$$R_7ArOR_8SO_2SCCl_3$$

wherein Ar is a member selected from the group consisting of naphthyl and phenyl radicals, R₈ is a member selected from the group consisting of saturated aliphatic hydrocarbon residues, olefinically unsaturated aliphatic hydrocarbon residues and alkylene-oxyalkylene residues and R₇ is at least one member of the group consisting of hydrogen atoms, the chlorine atom, nitro radicals, carboxyl radicals, alkyl radicals and alkoxy radicals.

2. A fungicidal composition comprising a compound corresponding to the general formula:

$$R_7ArOR_8SO_2SCCl_3$$

wherein Ar is a member selected from the group consisting of naphthyl and phenyl radicals, R₈ is a member selected from the group consisting of saturated aliphatic hydrocarbon residues, olefinically unsaturated aliphatic hydrocarbon residues and residues and R₇ is at least one member of the group consisting of hydrogen atoms, the chlorine atom, nitro radicals, carboxyl radicals, alkyl radicals and alkoxy radicals and a carrier therefor.

3. A method of destroying fungi harmful to plants comprising contacting the plants with a non-phytotoxic fungicidal composition containing a compound corresponding to the formula:

4. A method of destroying fungi harmful to plants comprising contacting the plants with a non-phytotoxic fungicidal composition containing a compound corresponding to the formula:

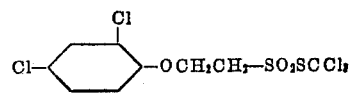

5. A method of destroying fungi harmful to plants comprising contacting the plants with a non-phytotoxic fungicidal composition containing a compound corresponding to the formula:

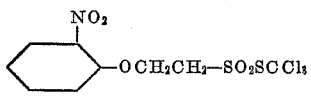

6. A method of destroying fungi harmful to plants comprising contacting the plants with a non-phytotoxic fungicidal composition containing a compound corresponding to the formula:

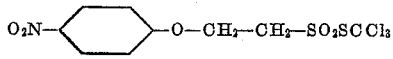

7. A method of destroying fungi harmful to plants comprising contacting the plants with a non-phytotoxic fungicidal composition containing a compound corresponding to the formula:

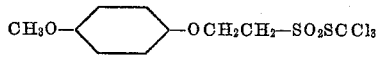

8. A method of destroying fungi harmful to plants comprising contacting the plants with a non-phytotoxic fungicidal composition containing a compound corresponding to the formula:

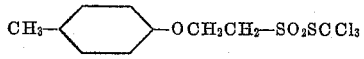

9. A method of destroying fungi harmful to plants comprising contacting the plants with a non-phytotoxic fungicidal compositiion containing a compound corresponding to the formula:

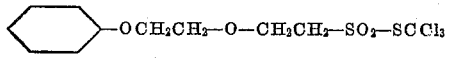

10. A method of destroying fungi harmful to plants comprising contacting the plants with a non-phytotoxic fungicidal composition containing a compound corresponding to the formula:

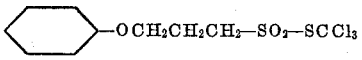

11. A method of destroying fungi harmful to plants comprising contacting the plants with a non-phytotoxic fungicidal composition containing a compound corresponding to the formula:

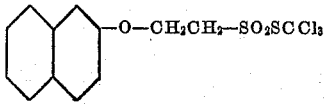

References Cited in the file of this patent

UNITED STATES PATENTS

| | | |
|---|---|---|
| Re. 22,597 | Ladd | Jan. 30, 1945 |
| 2,203,431 | Goldsworthy | June 4, 1940 |
| 2,217,207 | Horst | Oct. 8, 1940 |
| 2,220,981 | Horst | Nov. 12, 1940 |
| 2,417,992 | Niederl | Mar. 25, 1947 |
| 2,546,274 | Pritchard | Mar. 27, 1951 |
| 2,549,710 | Pritchard | Apr. 17, 1951 |
| 2,553,772 | Kittleson | May 22, 1951 |
| 2,553,775 | Hawley | May 22, 1951 |
| 2,553,777 | Hawley | May 22, 1951 |
| 2,655,514 | Kleiman | Oct. 13, 1953 |
| 2,730,324 | Binkley | Mar. 1, 1955 |
| 2,779,788 | Gysin | Jan. 29, 1957 |
| 2,779,941 | Gysin | Jan. 29, 1957 |

FOREIGN PATENTS

| | | |
|---|---|---|
| 1,099,722 | France | Mar. 23, 1955 |